UNITED STATES PATENT OFFICE.

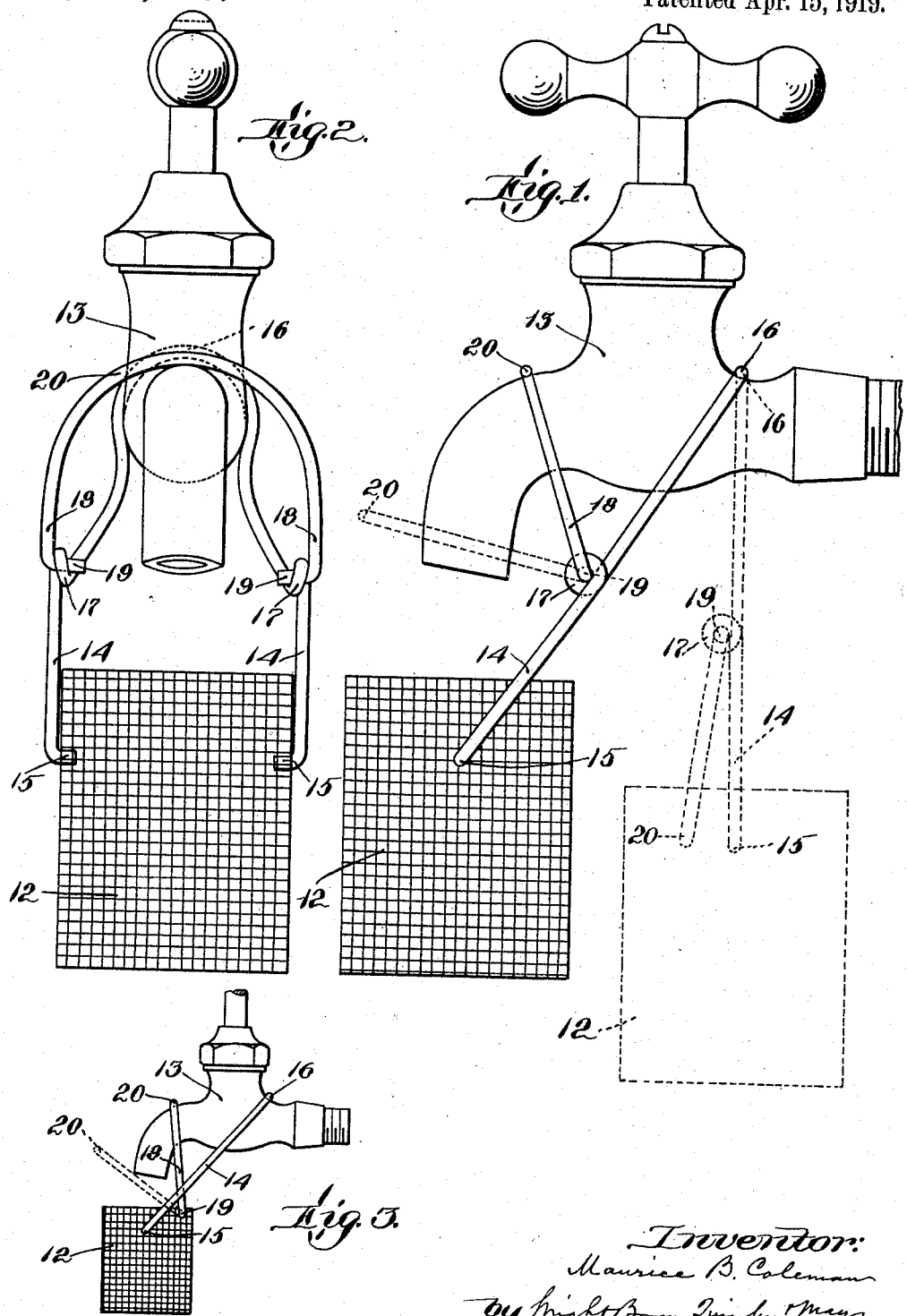

MAURICE B. COLEMAN, OF NEWTON, MASSACHUSETTS, ASSIGNOR OF ONE-HALF TO MICHAEL JOHN VAIL, OF NEWTON, MASSACHUSETTS.

SOAP-HOLDING ATTACHMENT FOR FAUCETS.

1,300,248.   Specification of Letters Patent.   Patented Apr. 15, 1919.

Application filed August 7, 1918.  Serial No. 248,692.

*To all whom it may concern:*

Be it known that I, MAURICE B. COLEMAN, a citizen of the United States, residing at Newton, in the county of Middlesex and State of Massachusetts, have invented new and useful Improvements in Soap-Holding Attachments for Faucets, of which the following is a specification.

This invention is embodied in a soap-holding attachment including a foraminous holder or basket, and means for detachably connecting the same with a faucet, in position to support small pieces of soap in the path of a stream of water issuing from the faucet, so that the water may be impregnated and form suds, the connecting means including an inner and an outer bail adapted conjointly to support the holder in an operative position, and to permit the convenient displacement of the attachment so that it will not interfere with the ordinary use of the faucet.

Of the accompanying drawings forming a part of this specification,

Figure 1 is a side view of a faucet and an attachment embodying the invention.

Fig. 2 is an end view of the same.

Fig. 3 is a view similar to Fig. 1, showing a modification.

The same reference characters indicate the same parts in all of the figures.

In the drawings, 12 represents a foraminous receptacle which is preferably a basket of woven wire, open at its upper end, and of suitable size to contain such small pieces of soap as are usually available at a kitchen sink.

Associated with the receptacle 12 is a means for detachably connecting the same with a faucet 13, the preferred embodiment of said means being shown by Figs. 1 and 2, which show a bail formed from a length of wire and including two arms 14, having inwardly projecting trunnions 15 entering orifices in opposite sides of the receptacle 12, a neck 16 connecting said arms and adapted to bear on an inner portion of the faucet, and eyes 17 located between the trunnions 15 and neck 16. The orifices which the trunnions enter may be spaces bounded by meshes of the wire fabric of which the receptacle is composed. Since the bail above described bears on an inner portion of the faucet, I call it the inner bail, to distinguish it from the companion bail hereinafter described.

The supporting means includes a bail made from a shorter length of wire and including arms 18 having trunnions 19 engaging the eyes 17, and a neck 20 adapted to bear on an outer portion of the faucet, this bail being therefore called the outer bail.

The two bails are adapted to be engaged with the faucet, as indicated by full lines in Figs. 1 and 2, and when thus engaged, support the receptacle 12 in the path of the stream of water issuing from the faucet, the water flowing through the receptacle and being impregnated by soap contained therein.

The hinge connection of the outer bail with the inner bail afforded by the eyes 17 and trunnions 19, enable the outer bail to be displaced or swung downwardly from its bearing on the faucet, thus permitting the entire attachment to be supported in an inoperative position by the inner bail, as shown by dotted lines in Fig. 1, the attachment being out of the path of water issuing from the faucet, so that it does not interfere with the ordinary use of the faucet.

Fig. 3 shows a modification in which the trunnions 19 of the outer bail are pivoted directly to the receptacle 12, instead of being pivoted to the inner bail, the attachment being supported conjointly by the outer and inner bails in an operative position, as shown by full lines, and adapted to be supported wholly by the inner bail in an inoperative position, as shown by dotted lines.

It will now be seen that the improved attachment enables waste pieces of soap to be conveniently supported adjacent to a faucet, moved into the path of water issuing from the faucet to form suds, and conveniently displaced and stored in an inoperative position available for use.

I claim:

1. A soap-holding attachment comprising a foraminous receptacle, and suspending means connected therewith and separably engageable with a faucet to operatively support the receptacle under the latter, said means including an inner bail adapted to bear on an inner portion of the faucet, and an outer bail adapted to bear on an outer portion of the faucet, the outer bail being displaceable to permit the attachment to be inoperatively supported by the inner bail.

2. A soap-holding attachment comprising a foraminous receptacle, and suspending means connected therewith and separably engageable with a faucet to operatively support the receptacle under the latter, said means including an inner bail pivoted to the receptacle and adapted to bear on an inner portion of a faucet, and an outer bail pivoted to the inner bail and adapted to bear on an outer portion of the faucet, the outer bail being displaceable to permit the attachment to be inoperatively supported by the inner bail.

3. A soap-holding attachment comprising a foraminous receptacle, and supporting means connected therewith and separably engageable with a faucet to operatively support the receptacle under the latter, said means including an inner bail composed of a length of wire including two arms having receptacle-engaging trunnions, a neck adapted to bear on an inner portion of a faucet, and eyes between said trunnions and neck, and an outer bail composed of a shorter length of wire including two arms having trunnions engaging said eyes, and a neck adapted to bear on an outer portion of the faucet, the outer bail being displaceable to permit the attachment to be inoperatively supported by the inner bail.

In testimony whereof I have affixed my signature.

MAURICE B. COLEMAN.

Copies of this patent may be obtained for five cents each, by addressing the "Commissioner of Patents, Washington, D. C."